UNITED STATES PATENT OFFICE 2,367,670

CEMENTING PROCESS

Robert Edward Christ, Wilmington, Del., assignor to E. I. du Pont de Nemours & Company, Wilmington, Del., a corporation of Delaware No Drawing. Application December 31, 1941, Serial No. 425,187

15 Claims. (Cl. 154—2)

This invention relates to a method of cementing a plurality of surfaces, all but one of which is transparent.

Surfaces are commonly united by interposing a layer of cement between the surfaces, the assembly being then held together until the bond becomes permanent. The time required for the cement to set up is often quite lengthy. This is especially true in the cementing of highly polymeric materials where the choice of adhesives is quite limited. A particularly important application of the cementing of transparent materials is in the assembly of the transparent material enclosing cockpits, bomber noses and gun turrets. The possibility that fighter pilots, bombardiers and gunners in fighting planes may be the victims of enemy fire is greatly increased by any distortion of vision or obstruction thereof in the transparent material. Thus, an improvement in the transparent material is of vital importance at the present time and is also of great importance in less disturbed times as such improvement facilitates the operation of aircraft in peace times.

This invention has as a particular object the provision of a process whereby improved assemblies of the transparent enclosures of cockpits, bomber noses and gun turrets are made possible. Another object is a new method of cementing transparent surfaces. A further object is the provision of a method for repairing imperfections in transparent sheets of organic polymeric plastic materials. Another object is the cementing of one or more transparent layers to another layer which may or may not be transparent. Other objects will appear hereinafter.

These objects are accomplished by the following invention wherein a plurality of surfaces of which not more than one is opaque are bonded together by interposing therebetween a photopolymerizable organic compound having an ethylenically bonded terminal methylene ($CH_2$) group which compound is fluid at the temperature of cementing and contains, as a catalyst for the photopolymerization thereof, an organic compound having a chain of two to three, preferably two, vicinal carbon atoms, each attached to but one oxygen atom, at least one of the vicinal carbon atoms being attached by two valences to one and the same oxygen atom, no oxygen atom being attached to more than one of the vicinal carbon atoms, any valences of said oxygen atoms not satisfied by a vicinal carbon atom being satisfied by hydrogen, the remaining valences of the vicinal carbon atoms being satisfied by hydrogen or monovalent hydrocarbon radicals, and thereupon exposing the cementing layer to light through a transparent member or members of the assembly.

The more detailed practice of the invention is illustrated by the following examples, wherein parts are given by weight. There are of course many forms of the invention other than these specific embodiments.

EXAMPLE I

This illustrates the sealing of methyl methacrylate bomber turrets.

The transparent turrets of present day bombers are often preformed in two separate sections. There has been an urgent need for a rapid and efficient method for sealing these two sections together with a clear, rigid bond without impairing the visibility. The cements in current use often require upwards of eight hours to approach full strength. The following technique accomplishes the same purpose in ten minutes. A cement is prepared by dissolving 0.25 part of benzoin and .35 part of lauroyl peroxide in 250 parts of methyl methacrylate monomer. The edge of the methyl methacrylate bomber turret to be sealed is dipped in this cement at 60° C. for two minutes and is then clamped firmly in the desired position on the second section. By irradiating with an ultraviolet light bulb placed about 1.5 inches from the seal, the bond becomes as strong as the methyl methacrylate itself, at the end of ten minutes. This method has the unique advantage of softening the surface of the strips enough so that all the saw marks and striations disappear at the point of contact. The result is a clear, smooth bond which is usually not realized when the cement is applied by brushing or spraying at room temperature.

EXAMPLE II

This illustrates the filling of crevices in methyl methacrylate bomber turrets whereby the sides of the crevice are homogeneously sealed together.

When two sections of a methyl methacrylate bomber turret are sealed together by means of an intervening tongue and groove rib, there often results a crevice due to imperfect fitting. Bomber turrets with crevices at the seams are usually rejected by the aeronautical industry because they fail to meet government specifications. These crevices can be filled by using a high polymer content syrup which is prepared by irradiating a solution of methyl methacrylate monomer containing 0.5% lauroyl peroxide and 0.17% benzoin for about two hours at room temperature with an ultraviolet lamp. The syrup is injected into the crevice by means of a ground glass hypodermic needle and then polymerized by irradiating for ten minutes with an ultraviolet lamp. The filled crevice does not impair the visibility of the turret.

EXAMPLE III

This example illustrates the sealing of two pieces of transparent polymeric material by using a monomer of the same type plus a photopolymerization catalyst, a peroxide catalyst and ultraviolet light.

Two strips of methyl methacrylate polymer (1" by 2.5" by ¼") were sealed together by overlapping 1 inch using the following procedure. One strip was dipped for 2 minutes at 60° C. on one side for a length of one inch in a solution of methyl methacrylate monomer containing 0.1% of benzoin and 0.14% lauroyl peroxide. This strip was clamped to a second strip and irradiated with an ultraviolet light bulb placed 1.5 inches from the seal. After ten minutes the bond was stronger than the methyl methacrylate itself as proved by testing in an Olsen machine. The methyl methacrylate broke before the bond broke.

EXAMPLE IV

This example illustrates the sealing of two pieces of a transparent material with a monomer of the same type plus a photopolymerization catalyst and ultraviolet light but without a peroxide catalyst.

Two strips of methyl methacrylate polymer (1" by 2.5" by ¼") were sealed together by the following procedure. One strip was dipped for 2 minutes at 60° C. on one side for a length of one inch in a solution of methyl methacrylate monomer containing 0.1% of benzoin. This strip was clamped in an overlapped position on the second strip and irradiated with an ultraviolet light bulb placed 1.5 inches from the seal for ten minutes. When tested in the Olsen machine, the methyl methacrylate broke before the bond broke.

EXAMPLE V

This example illustrates the sealing of two pieces of a transparent polymeric material with a monomer of a different type plus a photopolymerization catalyst and ultraviolet light.

Two strips of methyl methacrylate polymer (1" by 2.5" by ¼") were sealed together by the following procedure. One strip was dipped for 2 minutes at 60° C. in a solution of methyl acrylate

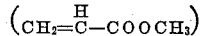
$$\left(\text{CH}_2\!=\!\overset{\text{H}}{\text{C}}\!-\!\text{COOCH}_3\right)$$

monomer containing 0.1% benzoin. This strip was clamped in an overlapped position on a second strip and irradiated with an ultraviolet light bulb for ten minutes. When tested in the Olsen machine, the methyl methacrylate broke before the bond gave way.

EXAMPLE VI

This example illustrates the sealing of two pieces of a transparent polymeric material by a mixture of monomers plus a photopolymerization catalyst and ultraviolet light.

Two strips of methyl methacrylate polymer (1" by 2.5" by ¼") were sealed together by the following procedure. One strip was dipped for 2 minutes at 60° C. in a half-and-half mixture of methyl methacrylate and methyl acrylate monomers containing 0.1% benzoin. This strip was clamped in an overlapped position on the second strip and irradiated with an ultraviolet lamp bulb for ten minutes. When tested in the Olsen machine, the methyl methacrylate broke before the bond broke.

EXAMPLE VII

This example illustrates the sealing of two pieces of a transparent polymeric material by a mixture of monomers plus a photopolymerization catalyst, a peroxide catalyst and ultraviolet light.

The same procedure was used as in the above Example IV except that the adhesive mixture contained 0.1% benzoin and 0.14% lauroyl peroxide. The seal was stronger than the bond when tested in the Olsen machine.

The following table gives the tensile strength at break of the bond between the materials indicated using an adhesive of 100 parts vinyl acetate monomer, 0.1 part lauroyl peroxide and 0.1 part benzoin, the bond being established as above.

Table I

| Polymers | Strength at break, lbs./in.² |
|---|---|
| Polyvinyl acetate-polyvinyl acetate | 178 |
| Polyvinyl acetate-polymethyl methacrylate | 144 |
| Polymethyl methacrylate-polymethyl methacrylate | *612 |
| Polymethyl methacrylate-polystyrene | **410 |
| Polyvinyl acetate-polystyrene | 93 |

The following table gives the tensile strength at break of the bond between the materials indicated using an adhesive of 100 parts vinyl acetate monomer, 0.2 part lauroyl peroxide and 0.2 part benzoin. The bond was established as above.

Table II

| Polymers | Strength at break, lbs./in.² |
|---|---|
| Polystyrene-polystyrene | **406 |
| Polymethyl methacrylate-polystyrene | **402 |
| Polyvinyl acetate-polystyrene | ***308 |
| Polymethyl methacrylate-polymethyl methacrylate | *612 |

In Tables I and II the polymethyl methacrylate broke before the bond in the instances marked \*, the polystyrene in those marked **\*\*, and the polyvinyl acetate in that marked \*\*\***.

EXAMPLE VIII

This example will illustrate the bonding of an inorganic transparent material (glass) to a transparent organic polymeric material by the use of a monomer of the same type plus a photopolymerization catalyst and ultraviolet light.

A strip of polymeric methyl methacrylate 1" by 2.5" by ¼") was dipped for 2 minutes at 60° C. on one side for a length of one inch in a solution of methyl methacrylate monomer containing 0.1% benzoin. This strip was clamped in an overlapped position on a strip of glass of the same size and irradiated with ultraviolet light for 10 minutes. In manual tests the bond was strong enough to satisfy practical use.

EXAMPLE IX

This example illustrates the sealing of two pieces of a transparent polymeric material by a monomer of a different type plus a photopolymerization catalyst and ultraviolet light.

Two strips of polystyrene were sealed together by dipping in a solution of methyl methacrylate containing 0.1% benzoin for 2 minutes at 60° C. and then irradiating for ten minutes with ultraviolet light. Although the styrene crazed slightly, the bond proved stronger than the styrene itself when tested in the Olsen machine.

EXAMPLE X

This example illustrates the sealing of cloth to a transparent polymeric material by a monomer of the same type plus a photopolymerization catalyst and ultraviolet light.

A strip of polymethyl methacrylate (1" by 2.5" by ¼") was dipped for 2 minutes at 60° C. on one side in a solution of methyl methacrylate monomer containing 0.1% benzoin. A piece of cloth was pressed against this material and then irradiation through the transparent layer was applied for a period of ten minutes with ultraviolet light. The cloth proved to be firmly bonded to the methyl methacrylate in manual tests.

EXAMPLE XI

This example illustrates the sealing of a metal to a transparent polymeric material by a monomer of the same type plus a photopolymerization catalyst, a peroxide catalyst, and ultraviolet light.

A strip of methyl methacrylate polymer (1" by 2.5" by ¼") was dipped for 2 minutes at 60° C. on one side in a solution of methyl methacrylate containing 0.1% benzoin and 0.14% lauroyl peroxide. This strip was clamped in an overlapping position on a strip of etched aluminum of the same size and irradiated with an ultraviolet light for ten minutes. In manual tests, the aluminum proved to be firmly bonded to the methyl methacrylate.

EXAMPLE XII

This example illustrates the sealing to wood of a transparent polymeric material by a monomer of the same type plus a photopolymerization catalyst, a peroxide catalyst, and ultraviolet light.

A strip of methyl methacrylate polymer (1" by 2.5" by ¼") was dipped for 2 minutes at 60° C. on one side in a solution of methyl methacrylate containing 0.1% benzoin and 0.14% lauroyl peroxide. This strip was clamped in an overlapping position on a strip of wood of similar size and irradiated with an ultraviolet light for ten minutes. The wood proved to be firmly bonded to the methyl methacrylate in manual tests.

The procedure of Example XII was also carried out using diacetyl as the photopolymerization catalyst as follows:

Methyl methacrylate was sealed to methyl methacrylate with an adhesive containing 0.14 g. of diacetyl and 0.14 g. of lauroyl peroxide dissolved in 100 g. of methyl methacrylate. The methyl methacrylate broke before the bond broke at 369 lbs./sq. in.

Methyl methacrylate was sealed to methyl methacrylate with an adhesive containing 0.14 g. of diacetyl and 0.14 g. of lauroyl peroxide dissolved in 100 g. of vinyl acetate. The methyl methacrylate broke before the bond broke at 345 lbs./sq. in.

Methyl methacrylate was sealed to methyl methacrylate with an adhesive containing 0.14 g. of diacetyl and 0.14 g. of lauroyl peroxide dissolved in 100 g. of methacrylonitrile. The methyl methacrylate broke first at 380 lbs./sq. in.

Methyl methacrylate was sealed to methyl methacrylate with an adhesive containing 0.14 g. of diacetyl and 0.14 g. of lauroyl peroxide dissolved in 100 g. of acrylonitrile. The methyl methacrylate broke first at 335 lbs./sq. in.

Methyl methacrylate was sealed to glass with an adhesive containing 0.14 g. of diacetyl, 0.14 g. of lauroyl peroxide, and 10 g. of methallyl methacrylate dissolved in 90 g. of methyl methacrylate. The glass adhered so strongly that it chipped out rather than broke away from the methyl methacrylate.

The examples illustrate the application of the invention to the cementing of a great variety of materials. The process of the invention may be used to cement any two surfaces providing that one of them is of a transparent material. Thus there may be employed for one of the materials a metal, e. g., aluminum, tin, magnesium, copper, silver, platinum, gold, chromium, tungsten, or iron or an alloy of these metals; an organic fibrous material, eg. g., cloth, paper, wood, leather; an inorganic transparent material such as glass; a polymeric material, e. g., natural or synthetic rubber, etc.

The invention is, however, of greater importance in the cementing either together, or to another material, of organic plastic polymeric materials, particularly those which are polymers of organic compounds having terminal ethylenically unsaturated methylene ($CH_2$) groups and especially vinyl and vinylidene polymers. These are in general transparent and therefore can be used between the cementing material and the light source. One plastic material can of course be pigmented or contain a filler as reinforcing material to such an extent as to be opaque to the light employed and still be cemented to another material provided that this latter be transparent. A particularly important material to be cemented is methyl methacrylate polymer. Its cementing with methyl methacrylate monomer or incomplete polymer is at present of great importance in national defense.

The cementing material is a photopolymerizable organic compound having an ethylenically unsaturated terminal methylene group, e. g., a photopolymerizable vinyl or vinylidene compound and any such material may be used. The cementing material should be fluid at cementing temperature which is usually within the range 0–100° C. and should adhere to the surfaces to be joined. This is regularly the case as is indicated above in the examples. Examples of suitable compounds are vinylidene chloride; acrylic and methacrylic acids, esters and amides thereof, for example, methyl acrylate, methyl methacrylate, methyl chloroacrylate, ethylidene dimethacrylate, methylene dimethacrylate, methacrylamide, and acrylamide; methyl vinyl ketone; phenyl vinyl ketone; acrolein; vinyl thioacetate; vinyl propionate; vinyl isobutyrate; vinyl acetate; vinyl chloroacetate; divinyl ether; phenyl vinyl ether; acrylonitrile; methacrylonitrile; N-vinylsuccinimide; indene; styrene; vinylnaphthalene; chloroprene; isoprene. In general best results are obtained when the cementing material is a monomer or fluid incomplete polymer of a material, the polymer of which constitutes the materials to be joined. Alkyl, particularly lower (1–4 carbon) alkyl, acrylates and methacrylates, i. e., esters of aliphatic acids R—COOH, wherein R is hydrocarbon, of 2–3 carbons and joined to carboxyl by a carbon in turn attached to another carbon by an ethylenic double bond, are preferred.

In the process of this invention the cementing is accomplished by subjecting to a light source the cementing material, containing the photopolymerization catalyst and situated between the surfaces to be cemented. Light of any wavelength from the infrared to the ultraviolet inclusive serves to effect the photopolymerization of the photopolymerizable adhesive containing the photopolymerization catalyst. A convenient wavelength band is that between 1800 Angstroms—the limit of transmission of a quartz tube in a mercury arc vapor lamp—and 7000 Angstroms—the lower limit for the infrared. The wavelengths of light to be used depend somewhat on the materials to be cemented but in general light which contains wavelengths higher than those to which the transparent material is partially or completely opaque are necessary. The preferred wavelengths are those falling in the range of 3200–7000 Angstroms. Although wavelengths below 3200 Å. are effective, no difference in the rate of polymerization is noted when wavelengths lower than 3200 Å. are prevented from reaching the photopolymerizable adhesive compound. 3200 Å. is the lower limit of transmission of plate glass and since light passing through this material is frequently used in this process, 3200 Å. represents a lower preferred limit. The upper limit of 7000 Å. represents the beginning of the infrared band. Wavelengths completely in the infrared effect the polymerization at a much slower rate than those of visible light. The rate of the photopolymerization varies directly with the intensity of the light and it is best to use an intense source of light, for example, sunlight, a mercury arc, or a high wattage tungsten bulb lamp. It is advantageous to use such a source of light that a controlled amount of light comes in contact with the monomer.

In the examples above benzoin and diacetyl are employed as the photopolymerization catalysts. However, there may be employed any organic compound having a chain of two to three vicinal carbon atoms, each attached by at least one valence to one but only one oxygen atom and at least one attached by two valences to but one oxygen atom, the valences of the oxygens not satisfied by the vicinal carbons being satisfied by hydrogen and the valences of the vicinal carbons not satisfied by oxygen being satisfied by hydrogen or by monovalent hydrocarbon radicals, aliphatic or aromatic.

One group of activators falling under this general classification is that of alpha-carbonyl alcohols of the formula RCO—CHOH—R′, wherein R and R′ are the same or different and are hydrogen atoms or monovalent hydrocarbon radicals. A sub-class falling under this generic classification are the acyloins, which are organic compounds of the above type, wherein R and R′ are aliphatic or aromatic hydrocarbon and which are formed from two molecules of an aldehyde by interreaction of the aldehyde groups. Illustrative of these compounds are glycolic aldehyde, benzoin, acetoin, butyroin, 3-hydroxy-4-methylpentanone-2, toluin, tert.-butylbenzoin, 12-hydroxy-13-ketotetracosane, and o- and p-tert.-butyltoluin. Of these, benzoin is the preferred specific compound. Hydrocarbon radicals substituted with halogen, sulfo, carbonyl, alkoxy, acyloxy and like groups are for the purposes of this invention equivalent to hydrocarbon radicals in the photopolymerization catalysts employed herein.

A second class is that of vicinal polyketaldonyl, i. e., poly oxo, compounds which are compounds of the formula R—(CO)$_x$—R′, wherein $x$ is an integer of two or three, preferably two, and R and R′ are hydrogen or monovalent aliphatic or aromatic hydrocarbon radicals. Illustrative polyketaldonyl compounds are: diacetyl, pentanedione-2,3, octanedione-2,3, 1-phenylbutanedione-1,2, benzil, 2,2-dimethyl-4-phenylbutanedione-3,4, glyoxal, phenylglyoxal, diphenyl triketone, and 1,2-cyclohexanedione. Of these, diacetyl is the preferred compound. The term "ketaldonyl" has been applied to designate the C=O group as it appears in aldehydes and ketones in contradistinction to the C=O group as it appears in acids. The expression "vicinal polyketaldonyl compound" as used herein designates a compound having a plurality of carbonyl groups of the aldehyde and ketone type, which carbonyl groups are vicinal, i. e., adjacent to one another.

The concentration of photopolymerization catalyst in the monomer is of importance because it appreciably affects the rate of polymerization. From 0.01% to 1.0% of the photopolymerization catalyst, based on the photopolymerizable compound, may be employed, with 0.08 to 0.15% preferred. When less than this amount of photopolymerization catalyst is employed the reaction proceeds slower, and when greater amounts than this are used, discoloration is apt to occur in the adhesive layer. Usually about 0.1% of an acyloin or diketone is employed, although either more or less can be used depending on the rate of polymerization desired. Furthermore, the photopolymerization catalyst need not be employed alone but can be used in conjunction with a peroxide. This has the advantages that if the monomer is only partially polymerized when irradiation is discontinued it will continue to polymerize at a fairly rapid rate and finally reach completion if the temperature is sufficiently high. Although lauroyl peroxide is the preferred peroxide for use, any organic solvent soluble peroxide may be used, for example, benzoyl peroxide, lauroyl peroxide, acetyl peroxide, butyroyl peroxide, succinyl peroxide, and ascaridole. In general, from 0.1% to 0.2% of peroxide, based on the photopolymerizable adhesive material, is preferred, but 0.5% or higher percentages are operable. Peroxides are not necessary in this reaction provided the exposure to light is long enough. Benzoyl peroxide, hydrogen peroxide, lauroyl peroxide and similar peroxides can be used in conjunction with the designated activators and lights.

The temperature at which the cementing is carried out is usually between 0 and 100° C. with temperature of 20–60° C. preferred. The objects to be cemented are pressed together sufficiently to keep the cementing composition in essentially complete contact with the surfaces to be cemented. The irradiation may be continued until the cementing material is solid or may be interrupted prior to that time, the polymerization continuing as indicated above. When all the surfaces to be cemented are transparent, it is of course immaterial from what side the cementing material is to be irradiated. When one of the materials is non-transparent the cementing surface is irradiated through the transparent material or materials. The cementing of two or more transparent materials to one non-transparent material using successive or simultaneous irradiation from, if necessary, two sides is within the scope of the invention.

The process of this invention is of use for sealing together sections of aeronautical equipment made from methyl methacrylate, e. g., the transparent materials enclosing cockpits, bomber noses and gun turrets. The time required to form a permanent bond is much shorter than any of the orthodox processes known at the present time. The bond is transparent and substantially homogeneous with the cementing material when a monomer of the polymeric material being cemented is employed. This is an advantage which is of vital importance to fighting airmen who will at times be shooting at targets having relative velocities in excess of four hundred miles per hour. The bonds formed are frequently stronger than the materials which are cemented together; hence this method of cementing may be employed in all the applications where regular adhesives are used.

The above description and examples are intended to be illustrtaive only. Any modification of or variation therefrom which conforms to the spirit of the invention is intended to be included within the scope of the claims.

What is claimed is:

1. A method of uniting surfaces of transparent polymeric methyl methacrylate which comprises interposing between said surfaces fluid, polymerizable methyl methacrylate containing from 0.01 to 1.0% benzoin and irradiating the same.

2. A method of uniting transparent solid polymeric materials of the class consisting of vinyl and vinylidene polymers which comprise interposing between the surfaces of said materials fluid, polymerizable methyl methacrylate containing from 0.01 to 1.0% of benzoin and irradiating the polymerizable methyl methacrylate.

3. A method of uniting transparent solid polymeric materials of the class consisting of vinyl and vinylidene polymers which comprises interposing between the surfaces of said materials fluid, polymerizable methyl methacrylate containing from 0.01 to 1% of an acyloin of the formula R—CO—CHOH—R', wherein R and R' are selected from the class consisting of monovalent aliphatic and aromatic hydrocarbon radicals and irradiating the cementing material.

4. A method of uniting transparent solid polymeric materials of the class consisting of vinyl and vinylidene polymers which comprises interposing between the surfaces of said materials a fluid photopolymerizable organic material selected from the class consisting of vinyl and vinylidene compounds and containing from 0.01 to 1.0% of an acyloin of the formula

R—CO—CHOH—R' wherein R and R' are selected from the class consisting of monovalent aliphatic and aromatic hydrocarbon radicals and  the cementing material.

5. A method of uniting transparent solid polymeric materials of the class consisting of vinyl and vinylidene polymers which comprises interposing between the surfaces of the same a fluid photopolymerizable organic compound of the class consisting of vinyl and vinylidene compounds and containing from 0.01% to 1.0% of a vicinal polyketaldonyl compound and irradiating the cementing material.

6. A method of uniting transparent solid polymeric materials of the class consisting of vinyl and vinylidene polymers which comprises interposing between the surfaces of the same a fluid photopolymerizable organic compound of the class consisting of vinyl and vinylidene compounds and containing from 0.01% to 1.0% of diacetyl and irradiating the cementing material.

7. A method of uniting transparent solid polymeric materials of the class consisting of vinyl and vinylidene polymers which comprises interposing between the surfaces of the same an alkyl ester of an aliphatic monocarboxylic acid wherein the carboxyl is attached to a hydrocarbon radical of two to three carbon atoms, the free valence of which radical stems from a carbon attached to another carbon by an ethylenic double bond, said ester containing in solution from 0.01% to 1.0% of a vicinal polyketaldonyl compound and irradiating the cementing material.

8. A method of uniting transparent solid polymeric materials of the class consisting of vinyl and vinylidene polymers which comprises interposing between the surfaces of the same a lower alkyl ester of an aliphatic monocarboxylic acid wherein the carboxyl is attached to a hydrocarbon radical of two to three carbon atoms, the free valence of which radical stems from a carbon attached to another carbon by an ethylenic double bond, said ester containing in solution from 0.1% to 1.0% of a vicinal polyketaldonyl compound and irradiating the cementing material.

9. A method of uniting transparent solid polymeric materials of the class consisting of vinyl and vinylidene polymers which comprises interposing between the surfaces of said materials a fluid photopolymerizable organic material selected from the class consisting of vinyl and vinylidene compounds and containing from 0.01 to 1.0% of a compound selected from the class consisting of vicinal polyketaldonyl compounds and acyloins of the formula R—CO—CHOH—R', wherein R and R' are selected from the class consisting of monovalent aliphatic and aromatic hydrocarbon radicals and irradiating the cementing material.

10. A method of uniting surfaces of transparent solid polymeric methyl methacrylate which comprises interposing between said surfaces fluid photopolymerizable methyl methacrylate containing from 0.01 to 1.0% of a compound selected from the class consisting of vicinal polyketaldonyl compounds and acyloins of the formula R—CO—CHOH—R', wherein R and R' are selected from the class consisting of monovalent aliphatic and aromatic hydrocarbon radicals, and 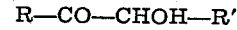 the cementing material.

11. A method of uniting surfaces of transparent solid polymeric methyl methacrylate which comprises interposing between said surfaces fluid photopolymerizable methyl methacrylate containing from 0.01 to 1.0% of an acyloin

R—CO—CHOH—R' wherein R and R' are selected from the class consisting of monovalent aliphatic and aromatic hydrocarbon radicals, and irradiating the cementing material.

12. A method of uniting transparent solid materials which comprises interposing between the surfaces of said materials a fluid photopolymerizable material selected from the class consisting of vinyl and vinylidene compounds and containing from 0.01 to 1.0% of a compound selected from the class consisting of vicinal polyketaldonyl compounds and acyloins of the formula R—CO—CHOH—R' wherein R and R' are selected from the class consisting of monovalent aliphatic and aromatic hydrocarbon radicals, and irradiating the cementing material.

13. A method of uniting transparent solid materials which comprises interposing between the surfaces of said materials a fluid photopolymerizable material selected from the class consisting of vinyl and vinylidene compounds and containing from 0.01 to 1.0% of benzoin and irradiating the cementing material.

14. A method of uniting transparent solid materials which comprises interposing between the surfaces of said materials fluid photopolymerizable methyl methacrylate containing 0.01 to 1.0% benzoin and irradiating the cementing material.

15. A method of uniting transparent solid materials which comprises interposing between the surfaces of said materials fluid photopolymerizable methyl methacrylate containing 0.01 to 1.0% benzoin and from 0.1 to 0.2% of lauroyl peroxide and irradiating the cementing material.

ROBERT EDWARD CHRIST.